(No Model.)
W. WATKINS.
WEIGHING SCALE.
No. 326,815. Patented Sept. 22, 1885.
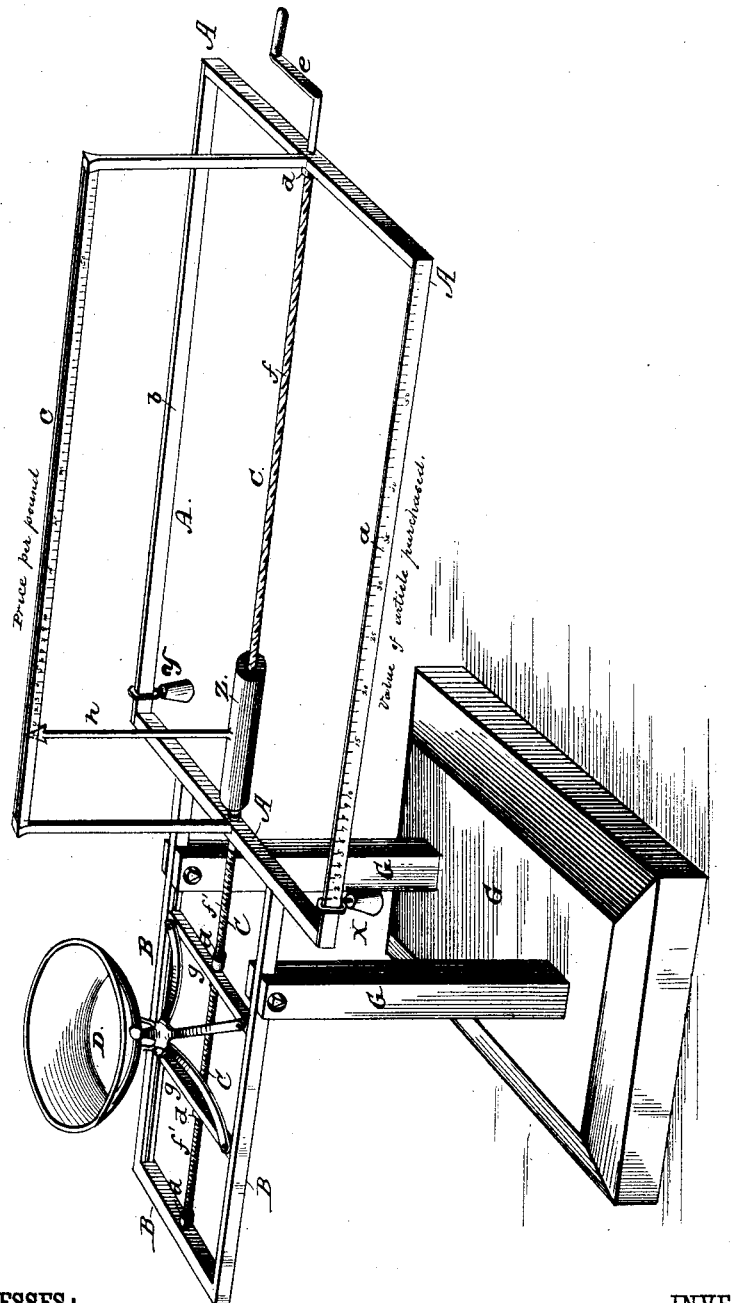
WITNESSES:
Fred G. Dieterich
Amos W. Hart
INVENTOR:
Wm. Watkins
BY Munn & Co.
ATTORNEYS.

United States Patent Office.

WILLIAM WATKINS, OF MOSS POINT, MISSISSIPPI.

WEIGHING-SCALE.

SPECIFICATION forming part of Letters Patent No. 326,815, dated September 22, 1885.

Application filed April 30, 1885. (No model.)

*To all whom it may concern:*

Be it known that I, WILLIAM WATKINS, a citizen of the United States, residing in Moss Point, in the county of Jackson and State of Mississippi, have invented a new and useful Improvement in Weighing-Scales; and I do hereby declare that the following is a full, clear, and exact description.

My invention is an improvement in the class of weighing-scales designed for use of grocers and various other retailers.

As is well known, customers frequently call for a given value of an article instead of the desired quantity in pounds, and the required calculation is sometimes sufficiently difficult to involve considerable time and a corresponding liability of error, more especially on the part of boys or other persons inexperienced in the business. I propose to avoid these results by providing a scale which shall indicate both price and quantity, and thus render the operation of weighing and determination of price upon an order for a given value of an article as easy and expeditious as upon an order for a definite number of pounds of such article. To this end I provide two scale-beams, one of which is graduated and inscribed to indicate values from one (1) cent to one hundred (100) cents, and the other to indicate the prices at which articles may be sold; and these beams are provided with weights whose adjustment enables the desired quantity of such articles in pounds to be instantly ascertained, as will be understood from the following description by reference to accompanying drawing, which represents a perspective view of my weighing-scale.

The frame of the scale consists of two oblong rectangular parts, A and B, on one of which the pan slides, and on the other the weights that balance it and indicate the number of pounds, the price, &c. The larger part A of the frame has two parallel bars or beams, $a$ and $b$. The beam $a$ is graduated and inscribed with numbers from 1 upward, reading from left to right and indicating the cents, (or dollars.) A weight, X, weighing one pound, is applied to the scale-beam $a$. The notches 1 2 3, &c., on said beam $a$ are one-fifth of an inch apart, for a purpose that will presently appear. A weight, Y, is applied to beam $b$, for a subsidiary purpose. From the middle of the end portions of said frame A rise two standards that support a horizontal bar, $c$, which is graduated and numbered from left to right, the several numbers being used for indicating the price per pound of article to be weighed and sold.

Through the lengthwise middle of both parts A and B of the frame extends a rod or shaft, C, having collars $d$ to prevent endwise movement, and a crank, $e$, for revolving it. The portion $f$ of the rod C that traverses the larger frame A is coarsely screw-threaded, and the part $f'$, that traverses the smaller frame B, is finely screw-threaded, but in the opposite direction. The number of threads to the inch of part $f'$ is five times as many as the threads of part $f$.

The scale-pan D is supported on transverse parallel bars $g$ $g$, which slide in frame B, and are moved in either direction by the screw-rod C that passes through them.

On the other portion, $f$, of rod C is placed a weight, Z, which is screw-threaded internally, so that the rotation of the latter will move it in a direction opposite that in which the pan D moves. An arrow-headed rod, $h$, is affixed to the weight Z, and its point moves in a lengthwise slot in bar $c$.

The whole frame A and B is fulcrumed in a suitable standard or rigid support, C, at points on the smaller part B of the frame, but near the end of the larger part A.

When the pan D and weights X Y Z are adjusted as near the fulcrum as practicable, as shown in the drawing, the pan is balanced. The pan D and its base are five times as heavy as the weight Z; but since the latter moves five times as far as the pan by one revolution of the rod C, it is obvious the scales will remain balanced so long as the weights X and Y remain at zero.

The practical operation of the apparatus will be understood from the following illustrations: Suppose a customer calls for one cent's worth of rice, and that this article is worth one cent per pound. The salesman rotates the crank until the arrow-head of rod $h$ points to 1 on beam $c$—that is to say, to the number indicating the price per pound of the article to be weighed. Simultaneously with this movement of weight Z to the right the pan D will move one-fifth as far to the left. Now, place weight X at notch 1 (which is one-fifth of an inch from O) to indicate the number of cents the customer desires to expend in his purchase. Then put rice in the pan D until the scale balances, and the operation is complete.

Suppose, now, that the price is double—that is to say, two cents per pound—and, as before, the customer wants one cent's worth. Evidently the weight Z and pan D must be moved apart until the arrow points to figure 2, (the price,) which is one inch from zero on bar C, and the weight X being, as before, placed at 1 (the value of amount of article called for) on bar $a$. The pan, or rather its base, will now be two-fifths of an inch from the fulcrum or zero, or twice as far as the weight X from zero on beam $a$. On putting rice in the pan D it will be found that one-half the amount required in the previous example will balance the scale, which is obviously the quantity the customer is entitled to at the double price per pound.

To get one cent's worth of rice at three cents per pound, the weight Z is moved till arrow points to 3 on bar $c$, and consequently the base of pan D will be moved one-fifth of an inch farther to the left than in the last example—that is to say, three-fifths of an inch from fulcrum, or three times as great as the distance of the space between figures 1 2 3, &c., in beam $a$. Now, the weight X being, as before, at 1 it will be perceived that the scale must balance with one-third the quantity of rice in the pan D that was required in the first example.

If, now, the quantity desired by the customer is much greater—say twenty-five cents' worth—the arrow is moved to 25 on bar $c$. This will give, of course, customer twenty-five pounds at one cent per pound, twelve and a half at two cents per pound, eight and one-third pounds at three cents per pound, six and one-fourth pounds at four cents per pound, and so on; and the required adjustment of weights X and Z will be readily made upon the principle of the examples above given. The weight Y is only used for indicating tare. For example, in case sugar or other substance adheres to the pan D, so that the latter is no longer balanced by the weight Z, then the weight Y is adjusted along bar $c$ until it restores the balance of the scale.

What I claim, and desire to secure by Letters Patent, is—

1. The combination, with a frame fulcrumed as specified, of a pan supported on one side of the fulcrum, a weight placed on the other, and a threaded rotatable rod for adjusting said pan and weight, for the purpose specified.

2. The combination of the fulcrumed frame, the rotatable screw-threaded rod, the adjustable pan, and the weight Z, provided with the arrow-rod, and the graduated bar $c$, having a guide-slot for said arrow-rod, all as shown and described, to operate as specified.

3. The combination, with the fulcrumed frame and a pan and weight arranged on opposite sides of the fulcrum to balance each other, of a differentially-threaded rotatable rod for adjusting them, a beam, $a$, graduated as specified and a weight placed thereon, a graduated and slotted bar, $c$, and a guide-rod attached to the weight on the screw-rod, all co operating as shown and described.

WILLIAM WATKINS.

Witnesses:
J. K. McLEOD,
P. H. FREELAND.